(12) United States Patent
Kubo et al.

(10) Patent No.: US 6,710,827 B2
(45) Date of Patent: Mar. 23, 2004

(54) LIQUID CRYSTAL DISPLAY DEVICE HAVING SUB-PIXEL ELECTRODES AND DEFECT CORRECTION METHOD THEREFOR

(75) Inventors: Masumi Kubo, Ikoma (JP); Yasunobu Akebi, Yamanobe-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 166 days.

(21) Appl. No.: 09/810,463

(22) Filed: Mar. 19, 2001

(65) Prior Publication Data

US 2001/0026343 A1 Oct. 4, 2001

(30) Foreign Application Priority Data

Mar. 31, 2000 (JP) .......................................... 2000-098108
Mar. 2, 2001 (JP) ......................................... 2001-058039

(51) Int. Cl.[7] ............................................ G02F 1/1343
(52) U.S. Cl. ......................... 349/55; 349/54; 349/114; 349/144; 349/192
(58) Field of Search ........................... 349/54, 55, 107, 349/114, 144, 192

(56) References Cited

U.S. PATENT DOCUMENTS

| | | | |
|---|---|---|---|
| 3,748,018 A | 7/1973 | Borden, Jr. | |
| 4,398,805 A | 8/1983 | Cole | |
| 5,132,819 A | 7/1992 | Noriyama et al. | |
| 5,220,444 A | 6/1993 | Mitsui et al. | |
| 5,499,120 A | 3/1996 | Hansen | |
| 5,847,789 A | 12/1998 | Nakamura et al. | |
| 5,977,563 A | 11/1999 | Kubo et al. | |
| 6,195,140 B1 | 2/2001 | Kubo et al. | |
| 6,295,109 B1 | 9/2001 | Kubo et al. | |
| 6,501,519 B2 * | 12/2002 | Ha et al. | ....................... 349/43 |

FOREIGN PATENT DOCUMENTS

| | | | |
|---|---|---|---|
| JP | 5-165055 A | 6/1993 | |
| JP | 11109417 A * | 4/1999 | ........... G02F/1/136 |

OTHER PUBLICATIONS

U.S. patent application Ser. No. 09/927,547 filed Aug. 13, 2001.

* cited by examiner

Primary Examiner—Toan Ton
Assistant Examiner—Andrew Schechter
(74) Attorney, Agent, or Firm—Nixon & Vanderhye, P.C.

(57) ABSTRACT

The present invention provides a liquid crystal display device in which each pixel electrode includes a plurality of sub-pixel electrodes and for which it is easy to correct a short-circuit defect, and a method for correcting such a defect. A pixel electrode includes a transparent electrode (first sub-pixel electrode) and a reflection electrode (second sub-pixel electrode). The distance between the transparent electrode and a counter electrode is greater than the distance between the reflection electrode and the counter electrode. The reflection electrode is connected to the drain electrode via a connection line provided separately from a path which electrically connects the transparent electrode to the drain electrode.

27 Claims, 5 Drawing Sheets

LIQUID CRYSTAL DISPLAY DEVICE HAVING SUB-PIXEL ELECTRODES AND DEFECT CORRECTION METHOD THEREFOR

BACKGROUND OF THE INVENTION

1. Field of the Invention

The present invention relates to a liquid crystal display device and a defect correction method therefor. More specifically, the present invention relates to a liquid crystal display device in which each pixel electrode includes a plurality of sub-pixel electrodes, and a defect correction method therefor.

2. Related Art and Other Considerations

Liquid crystal display devices, being slim in shape and having a small power consumption, have been widely used in various applications, including OA apparatuses such as word processors and personal computers, personal digital assistances such as electronic organizers, and monitors of camcorders.

Unlike a CRT (cathode ray tube) and an EL (electroluminescence) device, a liquid crystal display device itself does not emit light. Therefore, a liquid crystal display device typically displays an image by using light from an illumination device having a fluorescent tube therein (called a "backlight") which is arranged on the back side of the liquid crystal display device (this type of liquid crystal display device is called a "transmission type liquid crystal display device"). The backlight typically consumes more than 50% of the total power consumed by the liquid crystal display device. Therefore, apparatuses which are used outdoors and those which are always carried around by the user employ another type of liquid crystal display device (called a "reflection type liquid crystal display device") which is provided with a reflection plate instead of a backlight so as to display an image using the ambient light.

However, a reflection type liquid crystal display device has a very poor visibility when the ambient light is dark, while a transmission type liquid crystal display device has a poor visibility when the ambient light is very bright, e.g., under a clear sky, etc. In view of this, transmission-reflection type liquid crystal display devices (hereinafter, referred to as "two-way liquid crystal display devices") have been developed. A two-way liquid crystal display device includes a reflection electrode made of a light-reflecting material and a transparent electrode made of a light-transmitting material which are provided in the form of a single panel. A two-way liquid crystal display device can operate as a transmission type liquid crystal display device, when the ambient light is dark, displaying an image using light from a backlight which is transmitted through the transparent electrode, and can also operate as a reflection type liquid crystal display device, when the ambient light is bright, displaying an image using the ambient light reflected by the reflection electrode.

A two-way liquid crystal display device has a reduced power consumption as compared to a conventional transmission type liquid crystal display device because it does not use the backlight when the ambient light is bright. A two-way liquid crystal display device does not have the problem of being unable to obtain a sufficiently bright display when the ambient light is dark as in a conventional reflection type liquid crystal display device because it can display an image using the backlight when the ambient light is dark. In addition, a two-way liquid crystal display device, while operating as a transmission type display device, suppresses the undesirable reflection of the ambient light, e.g., light from a fluorescent lamp (which may be used for the display in a reflection mode), on the display surface, thereby improving the display quality of a transmission type liquid crystal display device.

However, the inventors of the present invention have found that when a display defect occurs in a two-way liquid crystal display device due to a short-circuit between a pixel electrode and the counter electrode or between adjacent pixel electrodes, the display defect cannot effectively be corrected with a conventional structure and a conventional correction method.

In a two-way liquid crystal display device having pixel electrodes each including a transparent electrode provided under an interlayer insulative film and a reflection electrode provided over the interlayer insulative film, a short-circuit caused by electrically conductive foreign matter often occurs between a reflection electrode and the counter electrode or between adjacent reflection electrodes.

When a display defect occurs due to such a short-circuit, if only the reflection electrode can be electrically disconnected, the transmission region of the defective pixel can still normally display an image because a predetermined voltage can still be applied to the transparent electrode. Thus, it is possible to correct the display defect without sacrificing the whole of the defective pixel.

However, with the conventional two-way liquid crystal display device structure and the conventional defect correction method, it is difficult to electrically disconnect only the reflection electrode, selectively, while maintaining the normal electrical connection of the transparent electrode.

This problem is not exclusively inherent to a two-way liquid crystal display device, but is common among various liquid crystal display devices in which each pixel electrode includes two or more sub-pixel electrodes (also called "divided pixel electrodes") which have respectively different distances from the counter electrode (interelectrode gaps).

SUMMARY OF THE INVENTION

In view of the above-mentioned conventional problem, the present invention has been devised for the purpose of realizing a liquid crystal display device in which each pixel electrode includes a plurality of sub-pixel electrodes and for which it is easy to correct a short-circuit defect, and realizing a method for correcting such a defect.

A liquid crystal display device of the present invention includes: a first substrate; a second substrate; and a liquid crystal layer provided between the first substrate and the second substrate, the first substrate including a plurality of switching elements and a plurality of pixel electrodes electrically connected to the plurality of switching elements, respectively, and the second substrate including a counter substrate opposing the plurality of pixel electrodes via the liquid crystal layer, wherein: each of the plurality of pixel electrodes includes a first sub-pixel electrode and a second sub-pixel electrode which are electrically connected to one of the switching elements, a distance between the first sub-pixel electrode and the counter electrode being greater than a distance between the second sub-pixel electrode and the counter electrode; and the second sub-pixel electrode is electrically connected to the switching element via a connection line provided separately from a path which electrically connects the first sub-pixel electrode to the switching element. Thus, the above-described object is achieved.

The first sub-pixel electrode may be a transparent electrode, and the second sub-pixel electrode may be a reflection electrode.

The liquid crystal display device may further include an interlayer insulative film provided over the plurality of switching elements, wherein the transparent electrode is provided under the interlayer insulative film, and the reflection electrode is provided over the interlayer insulative film.

The connection line may be provided from a same conductive layer as the transparent electrode, and the reflection electrode may be connected to the connection line via a contact hole provided in the interlayer insulative film.

The contact hole may be provided in a region where light from a first substrate side is not transmitted.

Preferably, the connection line has a second region whose line width is smaller than that of a first region corresponding to the contact hole.

The second region of the connection line may be provided in a region where light coming from a first substrate side is transmitted.

The reflection electrode may not be provided over the second region of the connection line.

The second substrate may include a light-blocking layer in a region opposing the second region of the connection line.

A method of the present invention is a method for correcting a defect in any of the above-described liquid crystal display devices, including the steps of: identifying a pixel electrode, among the plurality of pixel electrodes, in which a short-circuit defect via the second sub-pixel electrode has occurred; and electrically disconnecting the second sub-pixel electrode of the identified pixel electrode from the switching element by cutting off the connection line while maintaining the electrical connection between the first sub-pixel electrode of the identified pixel electrode and the switching element. Thus, the above-described object is achieved.

Preferably, where two adjacent pixel electrodes among the plurality of pixel electrodes are short-circuited with each other via the second sub-pixel electrode of one of the two adjacent pixel electrodes, the second sub-pixel electrode of one of the two adjacent pixel electrodes to which a write operation is performed first during a same frame is electrically disconnected from the switching element.

DETAILED DESCRIPTION OF THE INVENTION

Figure 1:
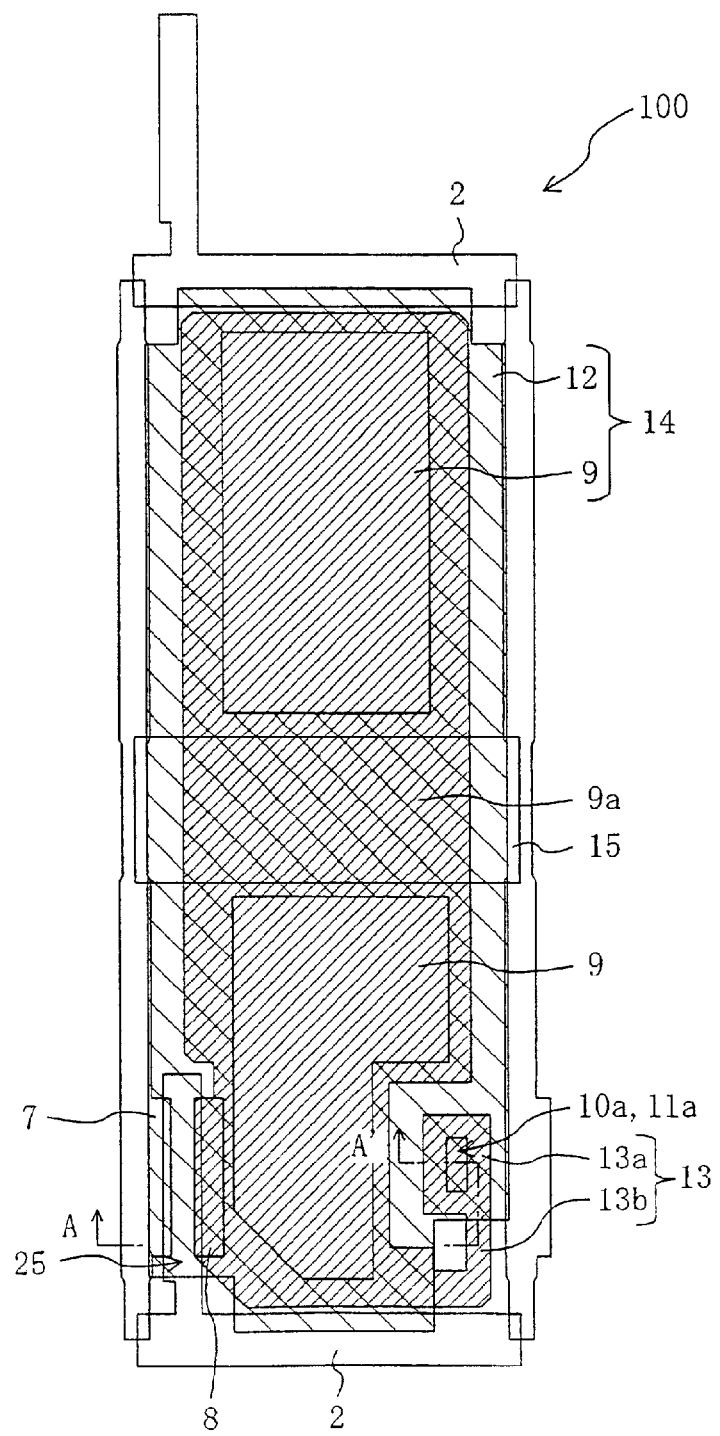
FIG. 1 is a plan view schematically illustrating a liquid crystal display device 100 according to an embodiment of the present invention.

A liquid crystal display device of the present invention includes a first substrate (e.g., a TFT substrate), a second substrate (e.g., a color filter substrate) and a liquid crystal layer provided therebetween. The first substrate includes, on the liquid crystal layer side thereof, switching elements (e.g., TFTS) and pixel electrodes electrically connected to the switching elements, respectively. Where each switching element is a TFT, each pixel electrode is connected to the drain of the TFT. The pixel electrode opposes a counter electrode, which is provided on the liquid crystal layer side of the second substrate, via the liquid crystal layer.

Each pixel electrode includes a first sub-pixel electrode and a second sub-pixel electrode which are electrically connected to the switching element, and the distance between the first sub-pixel electrode and the counter electrode is greater than the distance between the second sub-pixel electrode and the counter electrode. The difference in the distance (difference in the thickness of the liquid crystal layer) is adjusted so that the retardation of the liquid crystal layer (for two-way LCDs, for example) or the threshold voltage (for FLCDs and TN-LCDs, for example) is optimized for each region.

The second sub-pixel electrode (e.g., the sub-pixel electrode of the smaller gap) is electrically connected to the switching element via a connection line provided separately from a path which electrically connects the first sub-pixel electrode to the switching element. Therefore, by cutting off the connection line, it is possible to electrically disconnect only the second sub-pixel electrode, selectively, for which a short-circuit defect due to electrically conductive foreign matter, or the like, introduced into the liquid crystal layer, is likely to occur so that the first sub-pixel electrode can operate normally.

In a two-way liquid crystal display device in which the first sub-pixel electrode is a transparent electrode and the second sub-pixel electrode is a reflection electrode, the reflection electrode is connected to a switching element via a connection line provided separately from the electrical connection path between the transparent electrode and the switching element. Therefore, when, for example, the reflection electrode is short-circuited with the counter electrode due to electrically conductive foreign matter, or the like, the connection line can be cut off so as to electrically disconnect the reflection electrode from the switching element while maintaining the electrical connection between the transparent electrode and the switching element.

Thus, a voltage can be normally applied to the transparent electrode via the switching element. Because the reflection electrode and the counter electrode are short-circuited with each other, the reflection region will be a point defect. However, since a point defect in a reflection region is less visible than that in a transmission region, a sufficient display quality can be achieved by normally operating the transparent electrode.

The structure and the defect correction method as described above are also effective for correcting a blinking point defect, where a pixel electrode and the counter electrode are momentarily short-circuited or opened. Moreover, when the structure and the defect correction method are applied to a liquid crystal display device which displays an image in a normally blackmode, a reflection region after correction becomes a black spot, which is even less visible. Thus, there is provided a significant defect-correcting effect.

By providing the connection line from the same conductive layer as the transparent electrode, the structure of the liquid crystal display device can be simplified, thereby preventing the production process thereof from being complicated.

A contact hole is provided in the interlayer insulative film for electrically connecting the connection line to the reflection electrode. When the contact hole is provided in a region where light from the backlight is not transmitted, e.g., along a storage capacitor line, a scanning line or a signal line, the area which can be used as the transmission region for displaying an image is increased, thereby improving the effective aperture ratio of the transmission region.

With a structure where the connection line has a second region whose line width is smaller than that of a first region corresponding to the contact hole, the second region of the connection line can be easily cut off. When the second region of the connection line is provided in a region where light from the backlight is transmitted, the second region can be easily recognized from the first substrate side, and the second region can be reliably irradiated with laser light. With a structure where no reflection electrode is provided over the second region of the connection line, it is possible to avoid problems such as, for example, the metal layer (e.g., an Al layer) forming the reflection layer being partially chipped off by laser irradiation during the step of cutting off the connection line using laser light. Such a chipped piece of the metal layer may cause a short-circuit.

A region which is irradiated with laser light, or the like, for the purpose of defect correction often has a disturbed orientation of liquid crystal molecules, thereby failing to produce a normal display. Such a defect can be made less visible by employing a structure where a light-blocking layer is provided in a portion of the counter substrate corresponding to the portion of the connection line which is to be cut off (e.g., the second region as described above).

When two adjacent reflection electrodes are short-circuited with each other, the connection line can be cut off so as to electrically disconnect one of the reflection electrodes from the switching element. Then, a normal voltage can be applied to the reflection electrode which has not been disconnected, whereby the same voltage as this reflection electrode is also applied to the other reflection electrode which has been electrically disconnected. Thus, the display defect is less visible. Moreover, when two adjacent reflection electrodes along the same signal line are short-circuited with each other, one of the reflection electrodes to which a write operation is performed first during the same frame can be electrically disconnected from the switching element. Then, the disconnected reflection electrode is driven by a signal for one of the pixels to which a write operation is performed later during the same frame, whereby the display defect due to the electrically disconnected reflection electrode is even less visible. Where the display quality in the transmission mode is given a higher priority, it is preferred to electrically disconnect both of the reflection electrodes from the respective switching elements.

When a short-circuit between two adjacent pixels and a short-circuit between a reflection electrode and the counter electrode occur at the same time via the reflection electrode, it is preferred to electrically disconnect the reflection electrodes of both of the pixels from the respective switching elements.

Referring to the figures, liquid crystal display devices and defect correction methods of the present invention will now be described with respect to particular embodiments of the present invention. The present invention is not limited to the embodiments set forth below.

Figure 2:
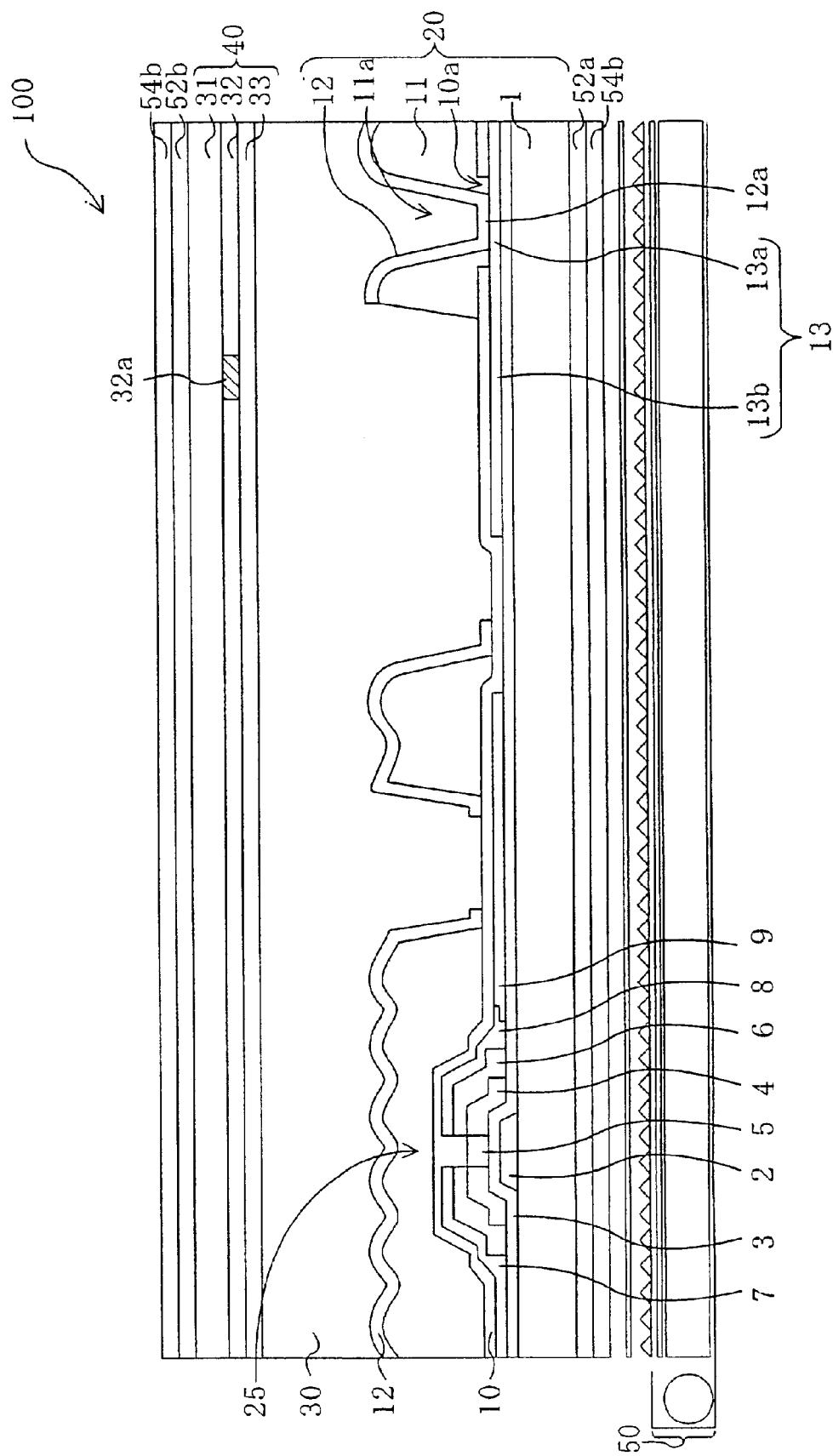
FIG. 2 is a cross-sectional view schematically illustrating the liquid crystal display device 100 according to the embodiment of the present invention.

FIG. 1 is a plan view illustrating a two-way liquid crystal display device 100 of one embodiment of the present invention, and FIG. 2 is a cross-sectional view illustrating the liquid crystal display device 100 taken along line A–A' of FIG. 1.

The liquid crystal display device 100 includes a TFT substrate 20, a color filter substrate 40 and a liquid crystal layer 30 provided therebetween.

The TFT substrate 20 includes a transparent substrate 1, TFTs 25 as switching elements provided on the transparent substrate 1, an interlayer insulative film 11 provided so as to cover the TFTs 25, and pixel electrodes 14 each of which is electrically connected to a drain electrode 8 of one of the TFTs 25. Each pixel electrode 14 includes a transparent electrode 9 provided under the interlayer insulative film 11 and a reflection electrode 12 provided over the interlayer insulative film 11. The transparent electrode 9 defines a transmission region for displaying an image in the transmission mode, and the reflection electrode 12 defines a reflection region for displaying an image in the reflection mode. The reflection electrode 12 is connected to the drain electrode 8 via a connection line 13 provided separately from a connection path which electrically connects the transparent electrode 9 to the drain electrode 8.

The color filter substrate 40 includes a transparent substrate 31. The color filter substrate 40 further includes a color filter layer (including a black matrix as necessary) 32, and a counter electrode 33 opposing the pixel electrode 14 via the liquid crystal layer 30 which are provided on the transparent substrate 31. Phase plates 52a and 52b and polarizing plates 54a and 54b are provided on the outer side of the TFT substrate 20 and the outer side of the color filter substrate 40, respectively. A backlight 50 is provided on the outermost side (the side away from the liquid crystal layer 30) of the TFT substrate 20.

The liquid crystal layer 30 is a liquid crystal layer capable of displaying an image in a polarization mode (e.g., a TN mode). However, the liquid crystal layer 30 is not limited to this. For example, when a liquid crystal layer of a guest-host mode is used, the phase plates 52a and 52b and/or the polarizing plates 54a and 54b can be omitted.

The structure of the TFT substrate 20 will now be described in greater detail with reference to FIG. 1. FIG. 1 illustrates, in a plan view, the structure of the TFT substrate 20 for one pixel region (a region corresponding to a pixel, which is the minimum unit of display).

The TFT substrate 20 includes the insulative transparent substrate (e.g., a glass substrate) 1, and the TFTs 25 which are arranged in a matrix pattern on the transparent substrate 1. A scanning line (gate bus line) 2 and a gate electrode 2 branching from the scanning line 2 are provided on the transparent substrate 1 by using a Ta layer, for example. A storage capacitor line 15 is provided from the same Ta layer as the scanning line 2. A gate insulating layer 3 covering these elements is provided by using SiNx, for example. The TFT 25 includes a semiconductor layer (e.g., an a-Si layer) 4, a contact layer (e.g., an n-type a-Si layer) 6, a source electrode 7 branching from a signal line (data bus line; e.g., a laminated film of a Ta layer and an ITO layer) 7, and a drain electrode (e.g., a laminated film of a Ta layer (lower layer) and an ITO layer (upper layer)) 8. In the semiconductor layer 4, a channel region 5, a source region and a drain region are provided. The TFT 25 may be any of the various types of TFTs known in the art.

The pixel electrode 14 including the transparent electrode 9 and the reflection electrode 12 is electrically connected to the drain electrode 8 of the TFT 25. The transparent electrode 9 is integrally formed with the ITO layer which is a layer overlying the drain electrode 8, and thus is electrically connected to the drain electrode 8. As an extension of the transparent electrode 9, the connection line 13 is provided from the same ITO layer. The connection line 13 includes a first region 13a for the connection to the reflection electrode 12, and a second region 13b whose width is smaller than that of the first region 13a.

The storage capacitor line 15 forms a storage capacitor together with the gate insulating film 3 provided over the storage capacitor line 15 and a transparent electrode 9a provided over the gate insulating film 3, thereby serving to store the voltage applied across the liquid crystal layer. The storage capacitor may be omitted.

An insulative film (e.g., an SiNx layer) 10 is provided substantially across the entire surface of the TFT 25, and the interlayer insulative film (e.g., a positive type photosensitive resin layer) 11 is provided over the insulative film 10. The insulative film 10 may be omitted. The reflection electrode (e.g., a laminated film of an Mo layer (lower layer) and an Al layer (upper layer)) 12 is provided over the interlayer insulative film 11. The interlayer insulative film 11 has a surface configuration with a plurality of concave/convex portions arranged irregularly so as to give the reflection light an appropriate degree of light distribution. The thickness of the interlayer insulative film 11 is selected so that the thickness of the liquid crystal layer 30 in the reflection region and that in the transmission region are respectively optimized (e.g., so that the thickness in the reflection region is ½ of that in the transmission region).

A contact portion 12a of the reflection electrode 12 is provided over the first region 13a of the connection line 13 (used for defect correction) exposed through contact holes 10a and 11a provided in the insulative film 10 and the interlayer insulative film 11, respectively, and the contact portion 12a is electrically connected to the first region 13a of the connection line 13. Thus, the reflection electrode 12 is electrically connected to the drain electrode 8 via the first region 13a and the second region 13b of the connection line 13, and the transparent electrode 9 in this order.

As described above, the electrical connection between the reflection electrode 12 and the drain electrode 8 is provided via the connection line 13 which is separate from the electrical connection between the transparent electrode 9 and the drain electrode 8. Thus, by cutting off the connection line 13, it is possible to electrically disconnect the reflection electrode 12 from the drain electrode 8 while maintaining the electrical connection between the transparent electrode 9 and the drain electrode 8. Therefore, in a case where, for example, electrically conductive foreign matter is present in a region above the reflection electrode 12 where the thickness of the liquid crystal layer is small, thereby short-circuiting the counter electrode 33 with the reflection electrode 12, only the reflection electrode 12 can be electrically disconnected from the drain electrode 8 by cutting off the connection line 13. Thus, the transparent electrode 9 can operate normally.

Moreover, since the connection line 13 includes the second region 13b whose width is smaller than that of the first region 13a and which is provided closer to the drain electrode 8 with respect to the first region 13a in contact with the reflection electrode 12, the step of cutting off the connection line 13 can be done by cutting off the second region 13b. The connection line 13 is cut off by, for example, laser light from the reverse side (the backlight side) of the TFT substrate 20.

It is preferred that the reflection electrode 12 is not provided in the second region (the region to be cut off) 13b of the connection line 13 as illustrated in FIG. 1. In this way, it is possible to prevent the metal layer forming the reflection electrode 12 from being partially chipped off and thus causing a short-circuit in a case where the cutting off step is done by irradiating the second region 13b with laser light. Moreover, it is preferred that the second region 13b of the connection line 13 is provided in a region where light from the backlight is transmitted, so that the second region 13b can be easily recognized from the reverse side of the TFT substrate 20 and thus reliably irradiated with laser light.

Figure 3:
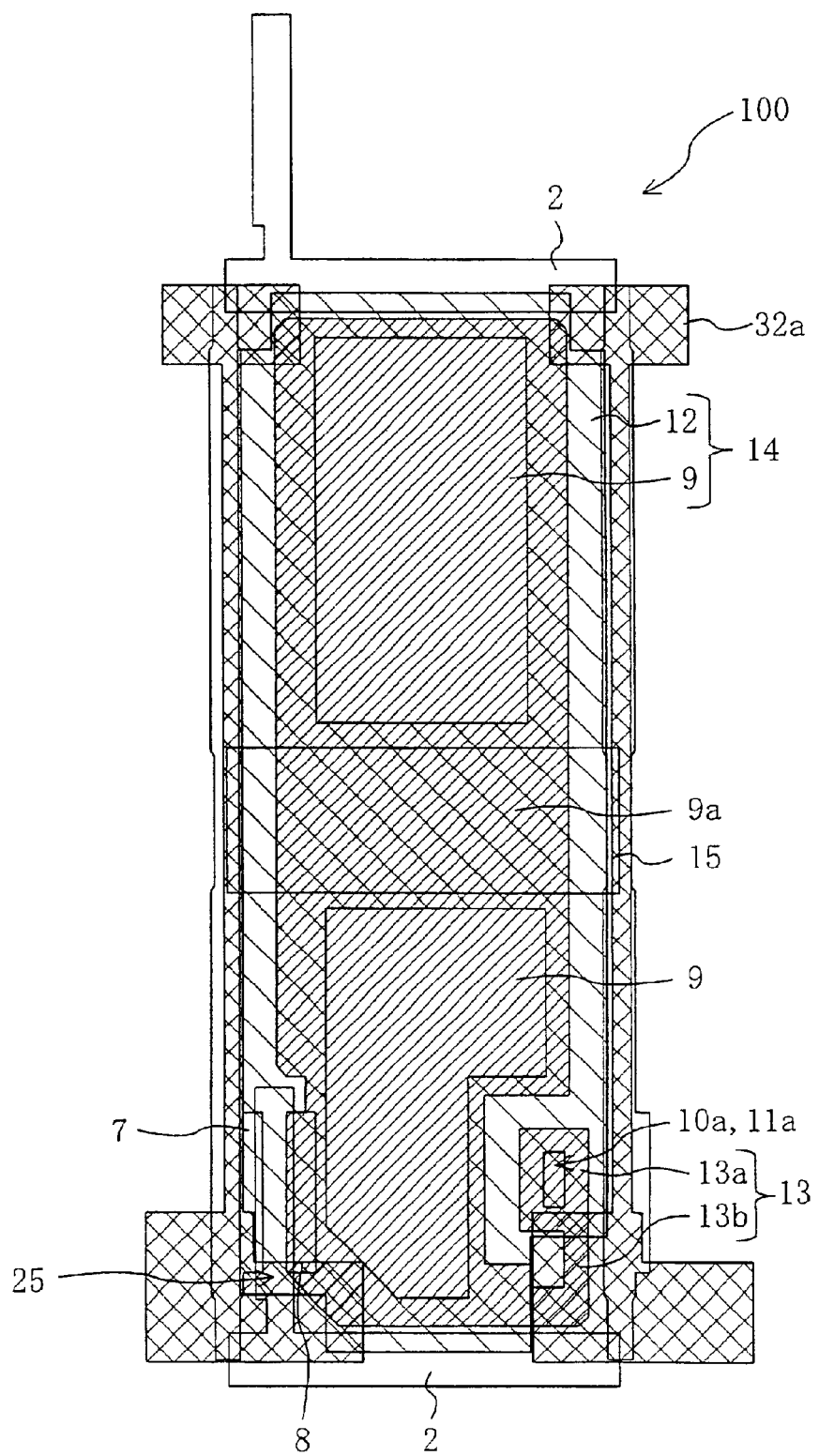
FIG. 3 is a plan view schematically illustrating the liquid crystal display device 100 according to the embodiment of the present invention, showing an arrangement of a light-blocking layer 32a provided on a color filter substrate.

A region which is irradiated with laser light, or the like, often has a disturbed orientation of liquid crystal molecules, thereby failing to produce a normal display. Such a defect can be made less visible by providing a light-blocking layer 32a in a region of the color filter substrate 40 corresponding to the second region 13b of the connection line 13, as illustrated in FIG. 2 and FIG. 3.

The arrangement of the connection line 13 is not limited to above-described example, but may any of various other arrangements.

Figure 4:
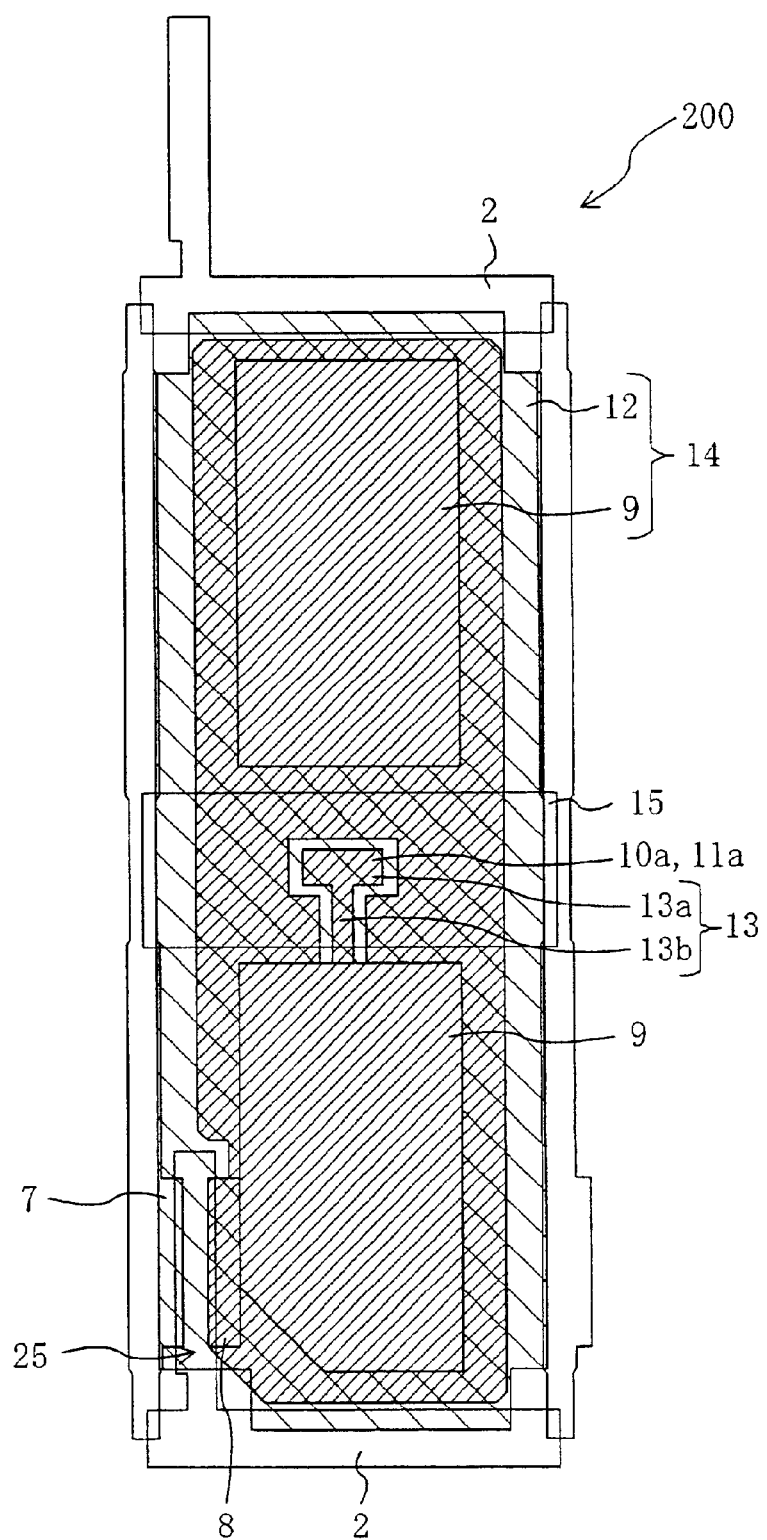
FIG. 4 is a plan view schematically illustrating a liquid crystal display device 200 according to another embodiment of the present invention.

For example, with a structure where the contact holes 10a and 11a are provided over the storage capacitor line 15, as in a liquid crystal display device 200 illustrated in FIG. 4, the effective aperture ratio of the transmission region can be improved from that of the liquid crystal display device 100 of FIG. 1, for the following reason. The liquid crystal molecules above the contact holes 10a and 11a are less likely to take a predetermined orientation and thus are difficult to use for the display. In view of this, the contact holes 10a and 11a can be provided in a region where light from the backlight is not transmitted (along the storage capacitor line 15, the scanning line 2 or the signal line 7, as described above), so that the area which can be used as the transmission region for displaying an image is increased, thereby improving the effective aperture ratio of the transmission region.

When the connection line 13 illustrated in FIG. 4 is cut off, it is preferred to cut off a portion of the narrow second region 13b which does not overlap with the storage capacitor line 15. In this way, it is possible to prevent the storage capacitor line 15 from being damaged. Moreover, it is preferred that the reflection electrode 12 is not provided at a position opposing the portion of the narrow second region 13b which is to be cut off.

While an example where the reflection electrode 12 and the counter electrode 33 are short-circuited with each other has been described above, the above-described structure and defect correction method can of course be used also in a case where a short-circuit occurs between two adjacent reflection electrodes 12.

When two adjacent reflection electrodes 12 are short-circuited with each other, the connection line 13 can be cut off so as to electrically disconnect one of the reflection electrodes 12 from the drain electrode 8. Then, a normal voltage can be applied to the reflection electrode 12 which has not been disconnected, whereby the same voltage as this reflection electrode 12 is also applied to the other reflection electrode 12 which has been electrically disconnected. Thus, the display defect is less visible.

When two adjacent reflection electrodes 12 along the same signal line are short-circuited with each other, one of the reflection electrodes 12 to which a write operation is performed first during the same frame (e.g., the one connected to the scanning line which is scanned first in a line sequential scanning operation) can be electrically disconnected from the drain electrode 8. Then, the disconnected reflection electrode 12 is driven by a signal for one of the pixels to which a write operation is performed later during the same frame, and thus is not subject to the influence of the gate/drain capacitance of the TFT 25 disconnected from the reflection electrode 12, whereby the display defect due to the electrically disconnected reflection electrode 12 is even less visible.

Since one TFT 25 is now responsible for driving the transparent electrode 9 and the reflection electrode 12 which are connected to the TFT 25 and also another reflection electrode 12 which is adjacent to and short-circuited with the reflection electrode 12, there is a large load on the TFT 25, whereby the TFT 25 does not operate normally. Still, the display defect can be made less visible than when the two reflection electrodes are both electrically disconnected.

For a two-way liquid crystal display device, which is capable of displaying an image both in the transparent mode and in the reflection mode, the correction method may be changed depending upon which display mode is given a higher priority. When the display quality in the transparent mode is given a higher priority, conversely to the above example, it is preferred that both of the short-circuited reflection electrodes 12 are electrically disconnected from the drain electrode 8. In this way, the transmission region of each of the pixels can normally display an image. Although the inoperable reflection region becomes a bright spot in a normally white mode, a bright spot in a reflection mode display is not as conspicuous as that in a transmission mode display. In a normally black mode display, the inoperable reflection region becomes a black spot and thus is inconspicuous.

When a short-circuit between two adjacent pixels and a short-circuit between a reflection electrode and the counter electrode occur at the same time via the reflection electrode, it is preferred to electrically disconnect the reflection electrodes of both of the pixels from the respective drain electrodes.

Figure 5:
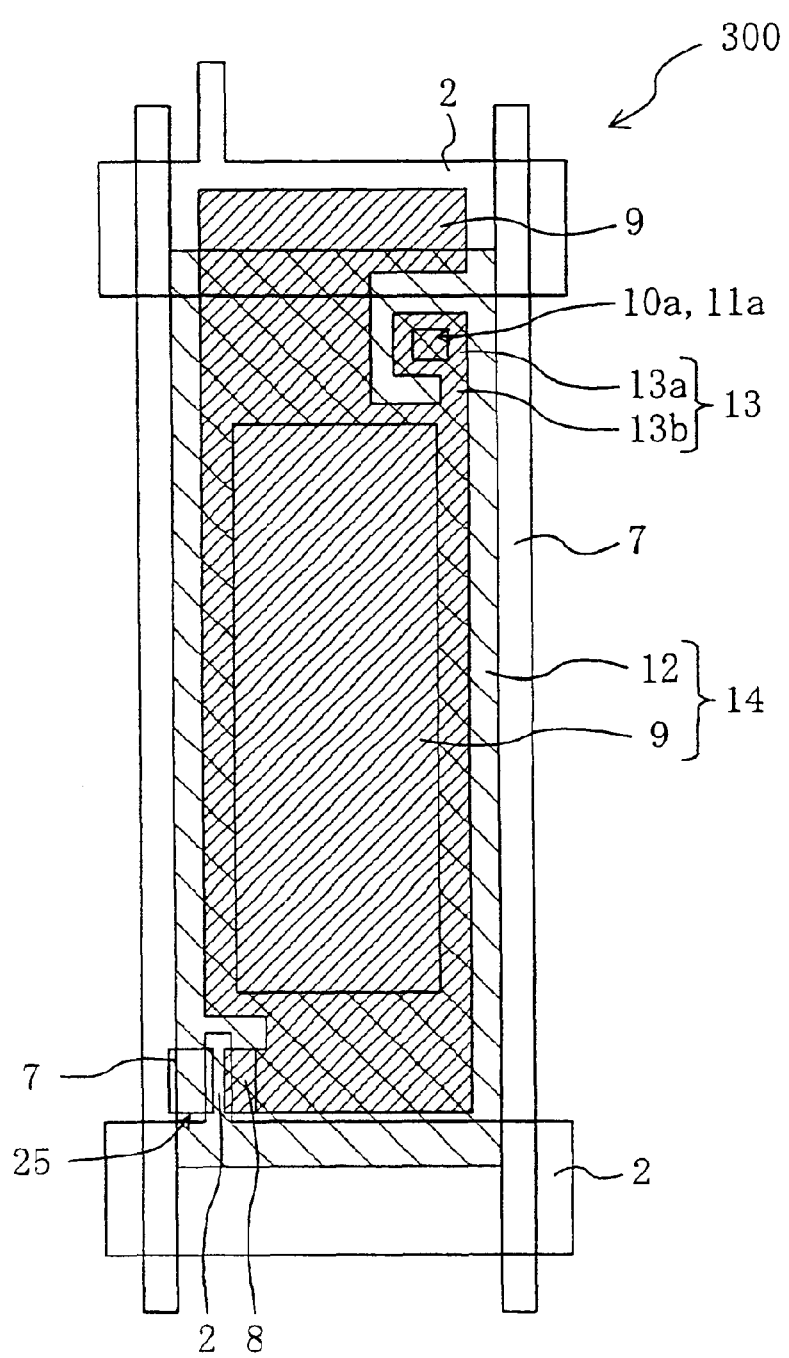
FIG. 5 is a plan view illustrating a liquid crystal display device 300 according to still another embodiment of the present invention.

FIG. 5 is a plan view illustrating a liquid crystal display device 300 according to still another embodiment of the present invention. The basic structure of the liquid crystal display device 300 is the same as the liquid crystal display device 100 and the liquid crystal display device 200. Therefore, each element having substantially the same function as that of the liquid crystal display devices 100 and 200 will be denoted by the same reference numeral.

In the liquid crystal display device 300, the pixel electrode 14 of a pixel overlaps with the scanning line 2 of an adjacent pixel (in the upper next row in the illustrated example) so as to form a storage capacitor (a so-called "Cs on Gate structure") The portion where the scanning line 2 and the transparent electrode 9 overlap with each other via the gate insulating layer 3 (see, for example, FIG. 2) functions as a storage capacitor.

The connection line 13 is provided in the vicinity of the storage capacitor and is provided from the same conductive layer (e.g., an ITO layer) as the transparent electrode 9. The connection line 13 includes the first region 13a for the connection to the reflection electrode 12, and the second region 13b whose width is smaller than that of the first region 13a. As in the structure illustrated in FIG. 2, the reflection electrode 12 is connected to the connection line 13 which is exposed through the contact holes 10a and 11a provided in the insulative film 10 and the interlayer insulative film 11, respectively since the connection line 13 includes the second region 13b whose width is smaller than that of the first region 13a and which is provided closer to the drain electrode 8 with respect to the first region 13a in contact with the reflection electrode 12, the step of cutting off the connection line 13 can be easily done by cutting off the second region 13b.

The present invention provides a liquid crystal display device in which each pixel electrode includes a plurality of sub-pixel electrodes such that when a short-circuit defect occurs via one of the sub-pixel electrodes which is closest to the counter electrode, it is easy to correct the defect so that the other sub-pixel electrode (s) of the pixel to which the short-circuit defect has occurred can operate normally. The present invention also provides a method for correcting such a defect.

The reflection electrode of the two-way liquid crystal display device of the present invention is connected to the switching element via a connection line provided separately from the electrical connection path between the transparent electrode and the switching element. Therefore, by cutting off the connection line, it is possible to electrically disconnect the reflection electrode from the switching element while maintaining the electrical connection between the transparent electrode and the switching element.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device comprising: a first substrate; a second substrate; and a liquid crystal layer provided between the first substrate and the second substrate, the first substrate including a plurality of switching elements and a plurality of pixel electrodes electrically connected to the plurality of switching elements, respectively, and the second substrate including a counter electrode opposing the plurality of pixel electrodes via the liquid crystal layer, wherein:

each of the plurality of pixel electrodes includes a first sub-pixel electrode and a second sub-pixel electrode which are electrically connected to one of the switching elements, a distance between the first sub-pixel electrode and the counter electrode being greater than a distance between the second sub-pixel electrode and the counter electrode; and the second sub-pixel electrode is electrically connected to the switching element via a connection line provided separately from a path which electrically connects the first sub-pixel electrode to the switching element;

wherein the first sub-pixel electrode is a transparent electrode, and the second sub-pixel electrode is a reflection electrode.

2. The liquid crystal display device of claim 2, further comprising an interlayer insulative film provided over the plurality of switching elements, wherein the transparent electrode is provided under the interlayer insulative film, and the reflection electrode is provided over the interlayer insulative film.

3. The liquid crystal display device of claim 2, wherein the connection line is provided from a same conductive layer as the transparent electrode, and the reflection electrode is connected to the connection line via a contact hole provided in the interlayer insulative film.

4. The liquid crystal display device of claim 3, wherein the contact hole is provided in a region where light from a first substrate side is not transmitted.

5. The liquid crystal display device of claim 3, wherein the connection line has a second region whose line width is smaller than that of a first region corresponding to the contact hole.

6. The liquid crystal display device of claim 5, wherein the second region of the connection line is provided in a region where light coming from a first substrate side is transmitted.

7. The liquid crystal display device of claim 5, wherein the reflection electrode is not provided over the second region of the connection line.

8. The liquid crystal display device of claim 7, wherein the second substrate includes a light-blocking layer in a region opposing the second region of the connection line.

9. A method for correcting a defect in a liquid crystal display device including: a first substrate; a second substrate; and a liquid crystal layer provided between the first substrate and the second substrate, the first substrate including a plurality of switching elements and a plurality of pixel electrodes electrically connected to the plurality of switching elements, respectively, and the second substrate including a counter electrode opposing the plurality of pixel electrodes via the liquid crystal layer, wherein: each of the plurality of pixel electrodes includes a first sub-pixel electrode and a second sub-pixel electrode which are electrically connected to one of the switching elements, a distance between the first sub-pixel electrode and the counter electrode being greater than a distance between the second sub-pixel electrode and the counter electrode; and the second sub-pixel electrode is electrically connected to the switching element via a connection line provided separately from a path which electrically connects the first sub-pixel electrode to the switching element, the method comprising the steps of:

identifying a pixel electrode, among the plurality of pixel electrodes, in which a short-circuit defect via the second sub-pixel electrode has occurred; and electrically disconnecting the second sub-pixel electrode of the identified pixel electrode from the switching element by cutting off the connection line while maintaining the electrical connection between the first sub-pixel electrode of the identified pixel electrode and the switching element.

10. The method of claim 9, wherein where two adjacent pixel electrodes among the plurality of pixel electrodes are short-circuited with each other via the second sub-pixel electrode of one of the two adjacent pixel electrodes, the second sub-pixel electrode of one of the two adjacent pixel electrodes to which a write operation is performed first during a same frame is electrically disconnected from the switching element.

11. The method of claim 9, wherein the first sub-pixel electrode is a transparent electrode, and the second sub-pixel electrode is a reflection electrode.

12. The method of claim 11, wherein the liquid crystal display device further including an interlayer insulative film provided over the plurality of switching elements, wherein the transparent electrode is provided under the interlayer insulative film, and the reflection electrode is provided over the interlayer insulative film.

13. The method of claim 12, wherein the connection line is provided from a same conductive layer as the transparent electrode, and the reflection electrode is connected to the connection line via a contact hole provided in the interlayer insulative film.

14. The method of claim 13, wherein the contact hole is provided in a region where light from a first substrate side is not transmitted.

15. The method of claim 13, wherein the connection line has a second region whose line width is smaller than that of a first region corresponding to the contact hole.

16. The method of claim 15, wherein the second region of the connection line is provided in a region where light coming from a first substrate side is transmitted.

17. The method of claim 15, wherein the reflection electrode is not provided over the second region of the connection line.

18. The method of claim 17, wherein the second substrate includes a light-blocking layer in a region opposing the second region of the connection line.

19. A liquid crystal display device comprising: a first substrate; a second substrate; and a liquid crystal layer provided between the first substrate and the second substrate, the first substrate including a plurality of switching elements and a plurality of pixel electrodes electrically connected to the plurality of switching elements, respectively, and the second substrate including a counter electrode opposing the plurality of pixel electrodes via the liquid crystal layer, wherein:

each of the plurality of pixel electrodes includes a first sub-pixel electrode and a second sub-pixel electrode which are electrically connected to one of the switching elements;

the second sub-pixel electrode is electrically connected to the switching element via a connection line provided separately from a path which electrically connects the first sub-pixel electrode to the switching element;

wherein the connection line comprises a first region which electrically contacts the second sub-pixel electrode and a second region, the second region having a smaller width than the first region; and wherein the second region has a smaller width than the first region to facilitate cutting of the second region for defect correction.

20. A liquid crystal display device, comprising: a first substrate; a second substrate; and a liquid crystal layer provided between the first substrate and the second substrate, the first substrate including a plurality of switching elements and a plurality of pixel electrodes electrically connected to the plurality of switching elements, respectively, and the second substrate including a counter electrode opposing the plurality of pixel electrodes via the liquid crystal layer, wherein:

each of the plurality of pixel electrodes includes a first sub-pixel electrode and a second sub-pixel electrode which are electrically connected to one of the switching elements, a distance between the first sub-pixel electrode and the counter electrode being greater than a distance between the second sub-pixel electrode and the counter electrode;

an interlayer insulation film separating the first sub-pixel electrode and the second sub-pixel electrode; and a connection line which electrically connects a contact region of the second sub-pixel electrode to the switching element, and wherein a defect correction region of the connection line between the second sub-pixel electrode contact region and the switching element is not overlaid by the second sub-pixel electrode.

21. The liquid crystal display device of claim 20, wherein the defect correction region is not overlaid by the second sub-pixel electrode and the first sub-pixel electrode.

22. The liquid crystal display device of claim 20, wherein the liquid crystal display device further comprises a source of backlight, and the defect correction region of the connection line is situated so that the backlight is transmitted through the defect correction region.

23. The liquid crystal display device of claim 20, the defect correction region has a narrow segment, the narrow segment being of a width which is smaller than the contact region of the second sub-pixel electrode.

24. A method of correcting a defect in a liquid crystal display device comprising: a first substrate: a second substrate: and a liquid crystal layer provided between the first substrate and the second substrate, the first substrate including a plurality of switching elements and a plurality of pixel electrodes electrically connected to the plurality of switching elements, respectively, and the second substrate including a counter electrode opposing the plurality of pixel electrodes via the liquid crystal layer, the method comprising:

providing each of the plurality of pixel electrodes with a first sub-pixel electrode and a second sub-pixel electrode which are electrically connected to one of the switching elements;

electrically connecting the second sub-pixel electrode to the switching element via a connection line provided separately from a path which electrically connects the first sub-pixel electrode to the switching element;

forming the connection line to comprise a first region which electrically contacts the second sub-pixel electrode and a second region, the second region having a smaller width than the first region; and wherein the second region has a smaller width than the first region, the smaller width of the second region being sized to facilitate cutting of the second region for defect correction.

25. The method of claim 24, further comprising, upon discovery of the defect in which two adjacent pixel electrodes among the plurality of pixel electrodes are short-circuited with each other via the second sub-pixel electrode of one of the two adjacent pixel electrodes, electrically disconnecting from the switching element the second sub-pixel electrode of one of the two adjacent pixel electrodes to which a write operation is performed first during a same frame.

26. A method of method of correcting a defect in a liquid crystal display device comprising: a first substrate; a second substrate; and a liquid crystal layer provided between the first substrate and the second substrate, the first substrate including a plurality of switching elements and a plurality of pixel electrodes electrically connected to the plurality of switching elements, respectively, and the second substrate including a counter electrode opposing the plurality of pixel electrodes via the liquid crystal layer, the method comprising:

including for each of the plurality of pixel electrodes a first sub-pixel electrode and a second sub-pixel electrode which are electrically connected to one of the switching elements, a distance between the first sub-pixel electrode and the counter electrode being greater than a distance between the second sub-pixel electrode and the counter electrode;

providing an interlayer insulation film to separate the first sub-pixel electrode and the second sub-pixel electrode;

using a connection line to electrically connect a contact region of the second sub-pixel electrode to the switching element;

providing a defect correction region of the connection line between the second sub-pixel electrode contact region and the switching element, the defect correction region not being overlaid by the second sub-pixel electrode.

27. The method of claim 26, further comprising, upon discovery of the defect in which two adjacent pixel electrodes among the plurality of pixel electrodes are short-circuited with each other via the second sub-pixel electrode of one of the two adjacent pixel electrodes, electrically disconnecting from the switching element the second sub-pixel electrode of one of the two adjacent pixel electrodes to which a write operation is performed first during a same frame.

* * * * *